US005665461A

United States Patent [19]
Wong et al.

[11] Patent Number: 5,665,461
[45] Date of Patent: Sep. 9, 1997

[54] LOW MOISTURE ABSORPTION SYNTACTIC FOAM

[75] Inventors: Raymond S. Wong, San Ramon; Clarence Lynn Mahoney, Berkeley, both of Calif.

[73] Assignee: The Dexter Corporation, Pittsburgh, Calif.

[21] Appl. No.: 945,176

[22] Filed: Sep. 15, 1992

[51] Int. Cl.$^6$ ................................. C08J 9/32
[52] U.S. Cl. .................... 523/218; 523/219; 428/325; 428/317.9
[58] Field of Search ................ 523/218, 219; 428/325, 317.9

[56] References Cited

U.S. PATENT DOCUMENTS

| | | | |
|---|---|---|---|
| 3,345,231 | 10/1967 | Gidge et al. | 156/181 |
| 3,345,232 | 10/1967 | Gidge et al. | 156/181 |
| 3,538,564 | 11/1970 | Skoler et al. | 28/107 X |
| 3,996,654 | 12/1976 | Johnson | 428/325 X |
| 4,013,810 | 3/1977 | Long | 428/325 X |
| 4,289,168 | 9/1981 | LeCourt et al. | 156/194 X |
| 4,433,068 | 2/1984 | Long et al. | 521/134 X |
| 5,019,605 | 5/1991 | Jannic | 523/218 X |
| 5,032,627 | 7/1991 | Wilson et al. | 523/218 |
| 5,041,472 | 8/1991 | Myer | 523/218 X |
| 5,064,868 | 11/1991 | Simpson et al. | 523/218 X |
| 5,120,769 | 6/1992 | Dyksterhouse et al. | 523/218 X |
| 5,158,727 | 10/1992 | Coleman-Kammula | 523/218 X |
| 5,234,757 | 8/1993 | Wong | 428/311.1 |

*Primary Examiner*—Daniel Zirker
*Attorney, Agent, or Firm*—Dorsey & Whitney LLP

[57] ABSTRACT

A syntactic foam in the form of a thin uniform sheet that possesses enhanced moisture resistance, which comprises a composite filled with hollow microspheres such as glass in a polymer matrix resin such as an epoxy resin where the resin encapsulates the microspheres and the filled composite at weight equilibrium has less than 15% of the available internal volume of the microspheres occupied by liquid water as determined by the LMA test. The process of making the sheet and composites incorporating the sheet is described.

9 Claims, 1 Drawing Sheet

LOW MOISTURE ABSORPTION SYNTACTIC FOAM

BRIEF DESCRIPTION OF THE INVENTION

A syntactic foam possessing enhanced moisture resistance comprising a composite of microspheres loaded in a polymer matrix such that the polymer encapsulates the microspheres, wherein, at equilibrium, the microspheres have less than 15% of the available internal volume occupied by liquid water.

BACKGROUND OF THE INVENTION

SynCore®, sold by Dexter Corporation, Aerospace Materials Division, Pittsburg, Calif. 94565 U.S.A., is a syntactic form film that takes the place of more expensive prepreg plies in stiffness critical structures. This syntactic foam is a composite material consisting of microspheres in a matrix resin. A wide variety of microspheres and matrices can be combined to make SynCore® materials. Glass is the most common microspheres material of construction, but quartz, phenolic, carbon, thermoplastic and metal coated microspheres have been used. Epoxies curing at 350° F. (177° C.) and 250° F. (121° C.) are the most common matrix resins, but matrices of bismaleimide (BMI), phenolic, polyester, PMR-15 polyimide and acetylene terminated resins have been used to produce SynCore® products. As a result of the wide variety of materials that successfully make SynCore® products, they are tailorable to a variety of applications. There is a version of SynCore® for cocuring with any known available heat-cured composite laminating resins. Syncore® provides a unique thin film form in isotropic foam structures. Syncore® allows sandwich core concepts to be used in a thinner dimension than previously possible. The thickness limit on honeycomb cores is approximately 0.125 inch. Syncore® is available in 0.007 to 0.125 inch thicknesses but can be made in thinner or thicker sheet forms. Other core materials such as wood and sheet foam can be made thin, but are not drapable and generally require an expensive/heavy adhesive film to bond to the partner composite components. In addition, Syncore® possess excellent uniformity in thickness which provides the ability to assure quality for the composite in which it is used as a component. Syncore® is typically used to replace prepreg plies where the intent is to increase stiffness by increasing thickness.

Designing with Syncore® is straightforward because all of the analysis methods that apply to other core materials such as honeycomb apply to it. Flexural stiffness of flat plates and beams increases as a cubic function of thickness allowing a lighter, stiffer lamination than could be made from prepreg plies alone. Since Syncore® on a per volume basis typically costs less than half of a comparable carbon prepreg, it also leads to a lower cost lamination. This is illustrated by the following:

1. Adding one ply of 0.020 inch Syncore® and eliminating one ply of prepreg does not change the weight or cost significantly, but nearly doubles the flexural rigidity.
2. Adding one ply of 0.020 inch Syncore® and eliminating three plies of prepreg sharply decreases the cost and weight with a small decrease in rigidity.
3. Adding one ply of 0.040 Syncore® and eliminating three plies of prepreg provides lower weight, cost and sharply increases rigidity.
4. The introduction of unidirectional tape allows a further increase in performance at lower cost and weight at nearly the some thickness.
5. A hybrid tape/fabric/Syncore® construction gives a very attractive set of weight and cost savings coupled with a 3.4 times increase in flexural rigidity.

Syncore® has been recommended for thin composite structures in any application where flexural stiffness, buckling, or minimum gauge construction is used. It has been shown to save weight and material cost in carbon fiber composites. It has been offered to save weight at approximately the same cost in the case of glass fiber composites.

The manufacturing methods for employing Syncore® are very similar to those used for prepregs. Because it is not cured, it is tacky and very drapable when warmed to room temperature and is easier to lay-up than a comparable prepreg ply. It can be supplied in supported forms with a light weight scrim to prevent handling damage when it is frozen. It requires cold storage like prepregs, usually 0° F. (−17.7° C.) or below. The various Syncore® typically have a room temperature out-time that is much longer than their companion prepregs. Because the microspheres provide a large degree of flow control, Syncore® does not show any unusual migration during cure when normal laminate lay-up and bagging procedures are used. Syncore® is less sensitive to cure cycle variations than prepreg making the controlling factor the composite cure cycle selection. It will cure void free under full vacuum or low (e.g. about 10 psig.) autoclave pressure. It has been cured at up to about 200 psi without exhibiting sphere crushing.

In a typical application, a sandwich of Syncore® and prepreg, such as a thicker layer of Syncore® between two thinner layers of prepreg, are held together under heat and pressure to cure the structure into a strong panel. Typical sandwich constructions of this nature are shown in U.S. Pat. Nos. 4,013,810, 4,433,068 and 3,996,654. Such composite structures typically are produced in flat sheets and in separable molds to obtain various desired shapes.

A method for making a pipe or tube using a prepreg is shown in U.S. Pat. No. 4,289,168. In this patent prepreg is wound in a coil on a mandrel, the mandrel and coil are pushed into a shaping mold, the resin is cured, and the shaped tubular member is removed from the mold and the mandrel is removed from the tube. The tube is formed entirely of prepreg with no syntactic form components such as Syncore®.

It has been found that all syntactic foams, including Syncore®, can absorb water to a volume that exceeds the volume of the resin matrix that makes up the foam. This additional water content in the composite can adversely affect the performance of the composite for a number of applications. The basis for this higher volume of water in the composite has been determined to be associated with the microspheres that are loaded into the resin to form the foam. It has been determined that certain microspheres, over time, gradually absorb water and trap it within the sphere. That added water becomes an incremental weight addition to the cared syntactic form, adding weight to the part with which the syntactic foam composite is associated. In addition, such moisture has the potential of adversely affecting the strength properties of the composite over time.

THE INVENTION

This invention relates to a syntactic foam possessing enhanced moisture resistance by minimizing the absorption of water into the composite. It comprises a composite of microspheres loaded m a polymer matrix such that the polymer encapsulates the microspheres in the some manner as the prior art. However, in this case, when the filled composite is at weight equilibrium, the microspheres have less than 15% of the available internal volume occupied by liquid water. The void volume is defined by the sum total of the internal void space provided by the microspheres in the syntactic foam. The invention resides in the selection and compositing within a matrix resin, microspheres that achieve the liquid water levels recited.

Certain microspheres have been found to be less water retentive than other microspheres. The microspheres encompassed by this invention are those that exhibit, according to the hereinafter defined low moisture absorption test ("LMA test"), the desired resistance to adverse moisture pickup. Apart from the LMA test, or one that is equivalent to it, there is no known way to differentiate, in terms of this invention, between the various microspheres that are known and available in the art and used for syntactic foam composite formation, such as Syncore®, for making the low moisture absorption products of the invention.

This invention is an improvement in the art of manufacture of syntactic foams, especially those that are formed into thin sheets, and used for composite forms, such as Syncore®. Thus the invention relates to thin composite films comprising a composite of microspheres loaded in a polymer matrix such that the polymer encapsulates the microspheres in the same manner as the prior art but when the filled composite is at weight equilibrium, the microspheres have, on average, less than 15% of the available internal void volume occupied by liquid water. The invention includes the selection and compositing within a matrix resin, microspheres that achieve the liquid water levels recited.

The invention also encompasses multi-layer composites where at least one of the layers contains a thin sheet of syntactic foam according to the invention in which the foam is a thin composite film comprising a composite of microspheres loaded in a polymer matrix such that the polymer encapsulates the microspheres in the same manner as the prior art but when the filled composite is at weight equilibrium, the microspheres have, on average, less than 15% of the available internal void volume occupied by liquid water. Such multi-layer composites include, as the other layers, such compositing materials as prepregs, honeycombs, and the like materials.

DETAILED DESCRIPTION OF THE INVENTION

Figure 1:
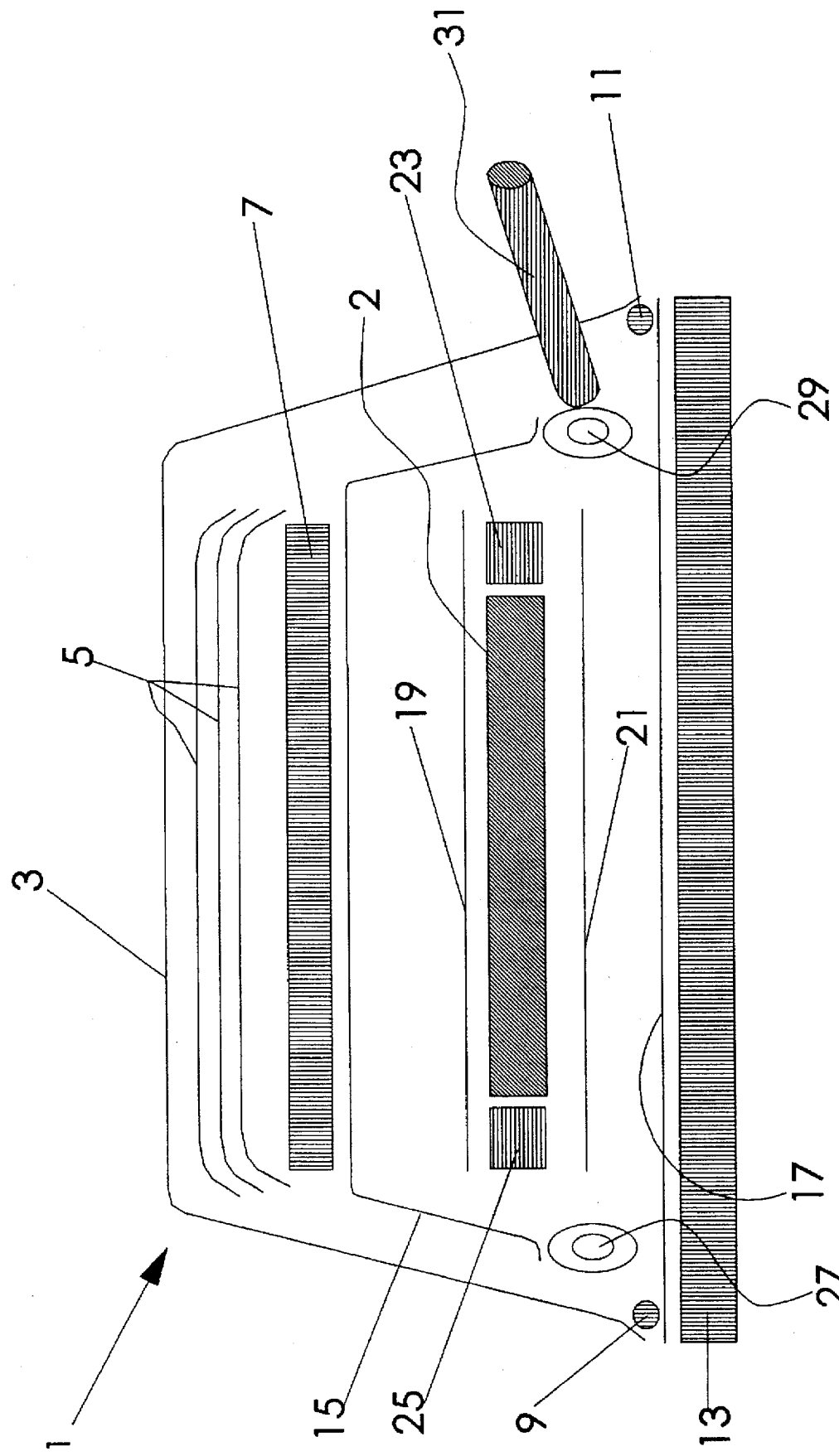
FIG. 1 is a schematic side view of a bagging system useful for curing syntactic foam test specimens.

It has been determined that syntactic foams absorb water and the amount of water absorbed is tied to the selection of microspheres in making the foam. The invention embraces Syncore® and Syncore®-like materials, having the attributes of a thin film of essentially uniform dimensions, which rely on the use of microspheres composited with a matrix resin, but with an essential difference from what was done before. That difference is the use of select microspheres that do not absorb deleterious amounts of water. A deleterious amount of water is defined as that amount where the microspheres have ≧15% of their available internal volume occupied by liquid water when the composite is at weight equilibrium according to the LMA test.

A syntactic foam is a material with a dimensionally stable interior void volume that is defined by microspheres made of a heterogeneous composition relative to the matrix resin. The matrix resin is the "glue" that holds the microspheres together and creates the cohesive composite structure. Hence, one may look at the matrix resin as an adhesive. The microspheres are small hollow structures that supply the void volume to the composite. Microspheres are commercially available materials and they may be made of organic or inorganic polymeric materials, such as synthetic polymers and glass. The synthetic polymers may be those formed by any heterolytic or homolytic mechanism induced by chemical means and influenced by physical effects, such as time, temperature and/or mass action. For example, the reaction can be nucleophilic or electrophilic, or it can involve free radical mechanisms. The synthetic polymers may be thermoplastics or thermosets. Particularly preferred microspheres are those made from glass. The choice of glass composition has not been determined to be critical to the performance of the invention. To that extent, any glass formulation used in the art for making microspheres may be employed in the practice of the invention. However, should the composition of the microspheres be a critical determinant in achieving the low moisture absorption which embodies the invention, then such is intended to be included in defining the invention. As noted previously, glass is the most common microsphere material of construction, and quartz, phenolic, carbon, thermoplastic and metal coated microspheres have been used.

Selection of Microspheres

As noted above, the invention is dependent upon the selection of the microsphere. It has not been determined whether the preferred microspheres function as they do because their chemical nature and/or physical structure (i) allows sufficient breathing of moisture in and out of the hollow interior of the microsphere so that excessive amounts of water do not condense within the individual microsphere or (ii) do not allow quantities of moisture into the hollow interiors so that significant condensation is possible or (iii) provides a unique mechanism by which water condensation or water retention of the magnitude of the prior art materials is not possible. It is believed that the preferred microspheres for achieving the invention possess sufficient surface porosity that moisture is transported in and out of the hollow interior without excessive buildup of water by condensation in the hollow interior. It is possible that the amount of water retained in microspheres suitable in forming the syntactic foam composites of the invention contain interior void spaces at pressures that exclude moisture pickup therein. Another theory for the effective operation of such microspheres is that the wall of the microsphere is so porous, that significant moisture buildup in the void space is not possible. Whatever is the reason, it has been demonstrated that relatively large concentrations of water can be absorbed in a syntactic foam unless the correct microsphere is chosen. The LMA test is conducted as follows:

The resin used in the test is an epoxy resin adhesive, based on a three part formulation, designated LP39207.0, that is commercially available from Dexter Corporation, Aerospace Materials Division, Pittsburg, Calif. 94565 U.S.A. The LP39207.0 formulation contains an epoxy resin part A, a curing agent mix part B that requires refrigeration storage conditions and a coupling agent part C. In preparing the syntactic resin/microsphere composition, a vessel capable of low shear mixing, heating and vacuum is desirable. A ½ or 1 gallon Ross™ mixer is such a suitable mixer. The vessel is preheated to 220° F. (104.4° C.), followed by the addition of 365 grams of Part A that had been preheated to 190°–200° F. (87.8° C.–93° C.). This is followed by addition to the vessel and to part A of 4.55 grams of part C and 147 grams of the microspheres and the combination is mixed at minimum speed for approximately seven minutes until the microspheres are evenly wetted out. The mixing is stopped and the vessel and blades are scraped down. Thawed[1] out Part B, 184 grams, is then added to the vessel and mixing is continued for 2 minutes. The vessel and blades are then scraped down followed by additional mixing at minimum speed, under vacuum from 28 inches Hg to 29.9 Hg, for 10 minutes, to degas the resin-microsphere mix. The resin-microsphere mix is then made into 0.10 in. sheets, while still warm, using appropriate forms and scrapers. Use appropriate care in handling the microspheres and avoid excess temperatures which can cause a hazardous exotherm. The cooled sheets are cured in an autoclave, using an appropriate bagging system, such as shown in FIG. 1. As shown in FIG. 1, bagging system 1 contains in it, resting on the top surface of tool 13, a syntactic resin system comprised of microspheres and epoxy resin LP39207.0 formulation as a sheet 2 having a thickness of about 0.095 to 0.105 inch. Separating film 2 from tool 13 is release film 21 as well as release film 17 that extends the over the full surface of tool 13. Another ply of release film, 19, lays on top of film 2. The edge of film 2 is controlled by edge dams 23 and 25. Comparable dams are provided at the other edges of the film. The edge dams should be protected from adhesion to the syntactic film 2. They should be snug to film 2 to prevent movement, and seal at any joint to prevent flow. The edge dam heights should not cause caul plate 7 to sit above film 2 thereby causing areas of little or no pressure. Another release film, 15, is shaped to enclose release films 19 and 21 and film 2, as well as the edge dams, e.g., 23 and 25. Film 15 extends to the center of the edge breather 27. Holding the assembly below it in position is caul plate 7. Allowing uniform vacuum in the system are multiple air weave surface breather cloths 5. If glass fiber or polyester paper is used for surface breathers, it should be trimmed to the edge of the lay-up. At several places, the surface breather is connected to the edge breather 27 using single yarns of fiberglass or the equivalent. If a flexible breather, e.g., airweave SS, is used for the surface breathers, it may be connected to the edge breather 27. The edge breather is part of the vacuum bag 3, surrounding the system. Circumscribing bag 3, and tool 13 are vacuum bag sealant or seal 9 and 11. Other sealants are provided along other edges of tool 13. Mother edge breather 29 in bag 3 is connected with vacuum tube 31, which is connected to a vacuum pump, not shown. The edge breathers are a minimum of 1 inch wide.

[1]Thawing is effected by allowing Part B to stand at room temperature. After fully thawed, Part B should be mixed in within a few hours.

The sheets are cured according to the schedule of:
1) Heat-up from room temperature to 350° F. (176.7° C.) over a 60 minutes period;
2) Hold the temperature at 350° F. (176.7° C.) for 60 minutes;
3) Cool down from 350° F. (176.7° C.) to room temperature in 60 minutes.

The specimens are then cut to 0.5"×2"×0.100±0.005" and the surfaces are sanded smooth. The cut sped-linens, 0.5"× 2"×0.10+0.005", are dried in a desiccator, weighed, and exposed submerged in water kept at 205° F.±5° F. (96° C.±2.8° C.) The specimen should not be exposed to boiling water temperatures. Periodic weight gain measurements until a weight gain equilibrium is attained. With microspheres having glass walls that are soluble in hot water, this can happen by 3–5 days. With microspheres having water insoluble glass walls, the time to achieve equilibrium water weight gain is primarily dependent on the microsphere intact wall thickness and temperature of the exposure test.

Simple calculation of the percent of the available microsphere void filled with water dramatically shows differences in microspheres in a SynCore® system where the microspheres are from different sources. The material properties needed for this determination are the following:

1. Amount and density of resin.
2. Amount and density of microspheres.
3. Amount and density of glass walls.
4. Experimentally determined absorption of water in the resin itself and in the resin-microsphere system.

The following formula calculates the volume percent of water in the interior voids of the microspheres, based on 100 grams of the above standard formulation containing 79.0 grams of LP39207.0 Resin and 21.0 grams of microspheres:

%VoidVolumeFilledByLiquidWater =

$$\frac{\frac{NW,cc}{DW,cc}}{SI,cc} = \left[ \frac{TW-RW-GW}{\frac{DW}{SV-GV}} \right] \cdot 100$$

wherein

NW (net weight of water)=TW (total weight of $H_2O$/100 g)−RW (resin weight Abs.)−GW (glass weight Abs.)

SI (interior void of microsphere)=SV (microsphere volume)−GV (glass wall volume)

GV=Wt. of Glass/Density of Glass (2.5)

SV=Wt. of Microspheres/Density of Spheres Glass Absorption typically 0.5–0.7% w.

DW is equal to the density of liquid water

Results of such calculations are summarized in Table 1 below.

TABLE 1

Results of Moisture Absorption Calculations
Percent Void Filling At Equilibrium, immersion, 200°–210° F. (93° C.–99° C.)

| | Time in days to Equilibrium | Microsphere | % Water Absorbed | Calc. Void cc | Water in Void, g | % Void Volume $H_2O$ Filled |
|---|---|---|---|---|---|---|
| a. | 95 | H20/1000 EPX | 90 | 96.6 | 84.7 | 87.7 |
| b. | 200 | H50/1000 EPX | 40 | 35.8 | 33.50 | 93.6 |
| c. | 200+ | FTD 200S | 8.3 | 87.2 | 3.0 | 3.4 |
| d. | 200+ | Resin Only LP39207.0 | 6.6 | 0 | 0 | 0 |
| e. | 5 | Q-Cel® 2106[2] | 63 | 96.8 | 57.8 | 60 |
| f. | 5 | Q-Cel® 636[3] | 49 | 50 | 43.8 | 88 |
| g. | 5 | Q-Cel® 650[4] | 29 | 35.4 | 22 | 64 |

[2]The PQ Corporation, Valley Forge, PA 19482, U.S.A.
[3]The PQ Corporation, Valley Forge, PA 19482, U.S.A.
[4]The PQ Corporation, Valley Forge, PA 19482, U.S.A.

As can be seen from the above data, the only microsphere that passed the water absorption standards of the invention is FTD 200S, which comprises silicon coupling agent treated, thin walled glass spheres having the following typical properties:

| Typical Properties | |
|---|---|
| Chemical | |
| $SiO_2$ | 93% |
| $Na_2O$ | 2% |
| $B_2O_3$ | 3% |
| BaO | 1% |
| Physical: | |
| Density (g/cc) | 0.20 |
| Softening Point (°C.) | 750 |
| Wall Thickness (μm) | 1.00 |

-continued

| Typical Properties | |
|---|---|
| Size Distribution (μm): | |
| 0–20 | 5.3% |
| 21–40 | 11.2% |
| 41–80 | 49.4% |
| 80+ | 34.1% |
| Strength - % Collapse | |
| @ 250 psi | 10% |
| @ 500 psi | 27% |
| @ 1000 psi | 65% |

Since the water absorption properties of the glass microspheres are believed dependent upon their method of manufacture, it is believed that the other microspheres offered by Emerson & Cumings provide the same desirable moisture resistance in the thin film syntactic foams of the invention.

The microspheres are synthetic hollow microspheres that comprise individual round spheres or bubbles having diameters which range from about 1 to about 500 microns, preferably about 1 to about 200 microns, with wall thicknesses of about 0.1 to about 20 microns. They typically possess densities ranging from about 0.05 to about 0.6 g./cc. The syntactic foam comprising the rigid microspheres in a resin matrix as a result have relatively low densities such as densities ranging from about 0.4 to about 0.7 g./cm$^3$. The syntactic foam comprising rigid microspheres in a resin matrix is often provided with a scrim support layer for the purpose of assisting is the handling and support of the syntactic foam layer. In describing this invention, such scrims are treated as integral components of the syntactic foam. Thus the term syntactic foam includes such handling assisting layers such as scrims.

The syntactic foam films have a thickness ranging from about 0.007 to about 0.125 inch and each film is essentially uniform in thickness. On the whole, such films do not vary in thickness more than about ±5%. Combinations of the syntactic foam films of different thicknesses can be combined to provide thicker sheet forms.

A typical embodiment of the invention comprises not only the syntactic foam but also a prepreg and/or honeycomb component. Other materials may be added without departing from the invention. The invention also contemplates the inclusion of one or more layers of a nonwoven fabric provided with a resin binder that is cocurable with the resin of the prepreg and the syntactic foam. These added layers serve to enhance the impact and buckling resistance of the composite structure. The nonwoven layer is provided in the in tubular construction in contact with the prepreg and/or syntactic foam layers. In the preferred aspect of this embodiment, such additional layers are placed between syntactic foam layers and/or between prepreg layers.

The nonwoven structures may be formed from unspun or spun staple fibers having a length of from about ¼ inch to about 3 inches by garnetting and crosslaying, airlaying on a rotating screen or on an endless tenter arrangement according to the procedure of U.S. Pat. No. 3,538,564, utilizing the apparatus of U.S. Pat. Nos. 3,345,231 and 3,345,232. The nonwoven structures may be resin impregnated by spraying the thermosetting resin as a solvent solution into the batting or scrim-like structures. Preferably, the nonwoven is first bonded with a low cost thermoplastic from a latex or water dispersion or with starch from an aqueous solution, dried to fix the fibers in the nonwoven 25 structure, and then the nonwoven structure is impregnated with the thermosetting resin. The nonwoven can be supported by a scrim layer in much the same manner that the syntactic foam is supported by one or more scrim layers.

Epoxy systems curing in the range from 150°–400° F. (65.5°–204.4° C.) are the most common matrix resins for SynCore® products including the products of this invention, but matrices of bismaleimide (BMI), phenolic, polyester, PMR-15 polyimide and acetylene terminated resins have been used. The most widely used matrix resin are the epoxy resins, and a wide variety are suitable for use in the practice of this invention. illustrative of such epoxy resins are the following:

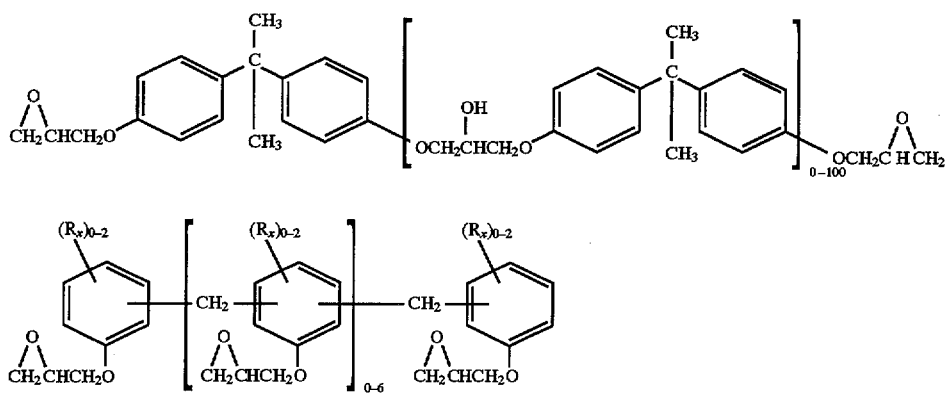

-continued
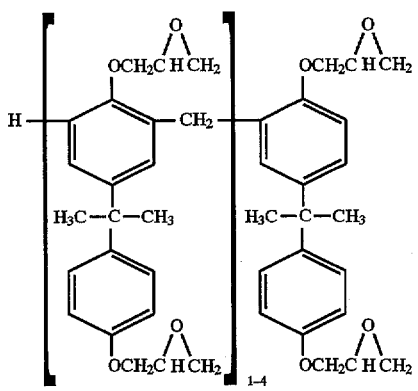
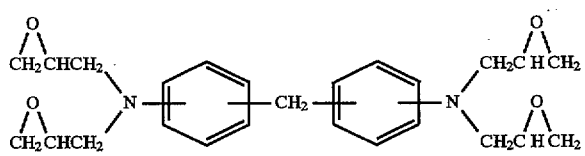
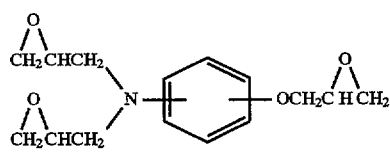
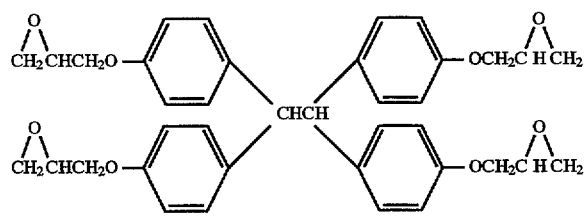
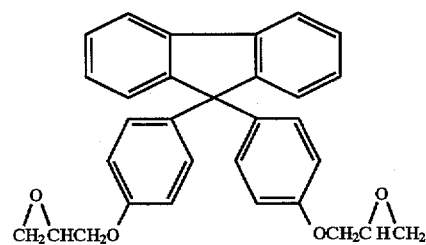
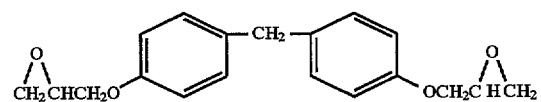
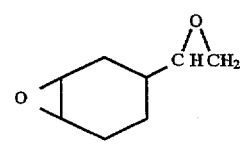
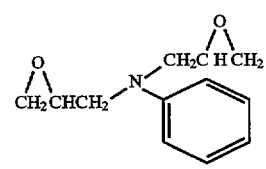

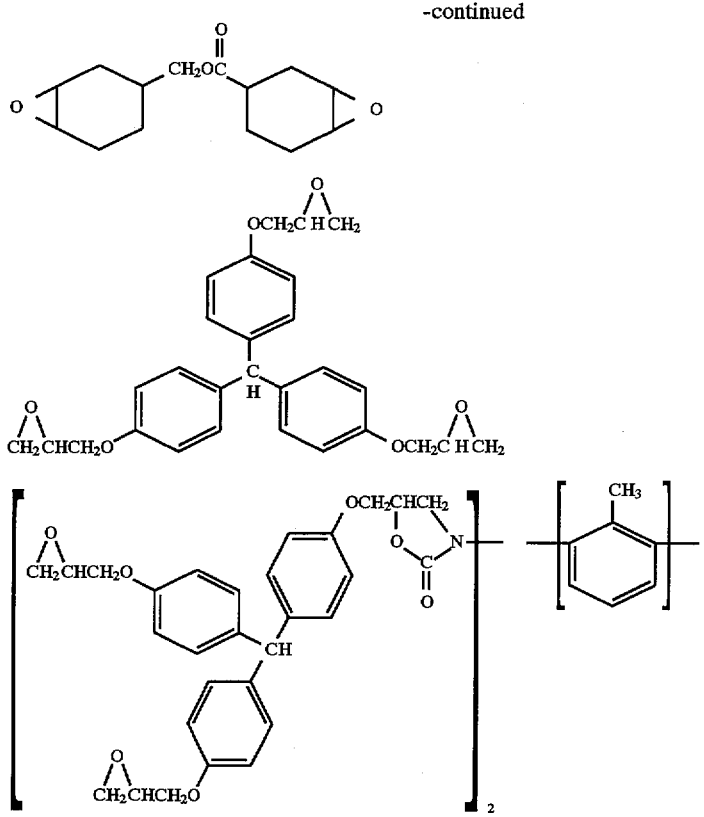

The epoxy resin systems contain epoxy curing agents to form solid, infusible products. For this purpose, epoxy curing agents which are acidic, neutral or alkaline may be used. Examples include, among others, amines hardeners, phenols, acid anhydrides, polyamides and Lewis acids and bases. Desirably, the epoxy resins of the invention are combined with hardeners which cure the resin to a thermoset condition. The preferred hardeners are amine compounds, ranging from dicyandiamide, to ureas, to aliphatic and aromatic amines. A preferred class of hardeners are the aromatic amines encompassed by the formula:

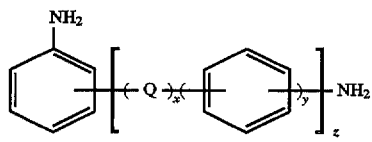

wherein Q is one or more of a divalent group such as —SO$_2$—, —O—, —RR'C—, —NH—, —CO—, —CONH—, —OCONH—, and the like, R and R' may each independently be one or more of hydrogen, phenyl, alkyl of 1 to about 4 carbon atoms, alkenyl of 2 to about 4 carbon atoms, fluorine, cycloalkyl of 3 to about 8 carbon atoms, and the like, x may be 0 or 1, y may be 0 or 1 and is 1 when x is 1, and z may be 0 or a positive integer, typically not greater than about 5.

Another preferred class of hardeners are the aliphatic amines such as the alkyleneamines. Illustrative of suitable alkyleneamines are the following: monoethanolamine, ethylenediamine, N-(2-aminoethyl)ethanolamine, diethylenetriamine, piperazine, N-(2-aminoethyl) piperazine, triethylenetetramine, tetraethylenepentamine, pentaethylenehexamine, diaminoethylpiperazine piperazinoethylethylenediamine, 4-aminoethyltriethylenetetramine, tetraethylenepentamine, aminnoethylpiperazinoethylethylenediamine, piperazinoethyldiethylenetriamine, and the like.

Another class of hardeners, but which can also be used as extender of the epoxy resin, are the higher molecular weight poly(oxyalkylene)polyamines such as those of the following formulas:

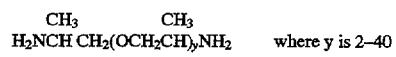

where y is 2–40

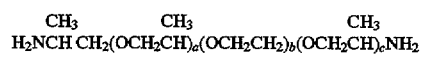

where a + c is about 2.
and b is 8–45.

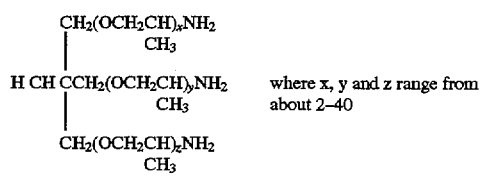

where x, y and z range from about 2–40

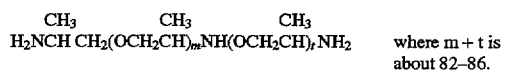

where m + t is about 82–86.

Preferred hardeners are diamines of the formula:
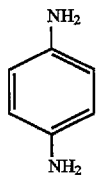
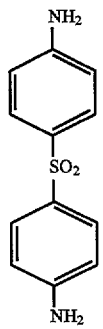
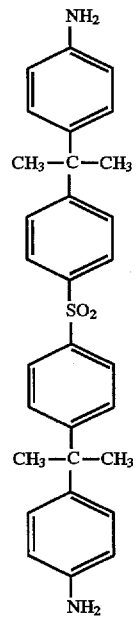
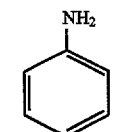
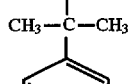
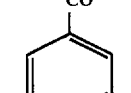
-continued

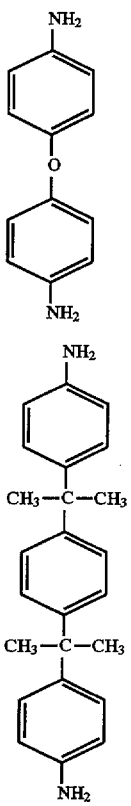

The hardener may be a monoamine such as aniline, para-aminophenol, and alkylated versions of them. Other desirable hardeners are the reaction products of dialkylamines, such as dimethylamine, diethylamine, methylethylamine, di-n-propylamine, and the like, with a variety of mono and diisocyanates to form mono and diureas. Any of the polyisocyanates listed below may be so reacted for use as a hardener. Specific illustration of useful hardeners are those encompassed by the following formulas and descriptions:

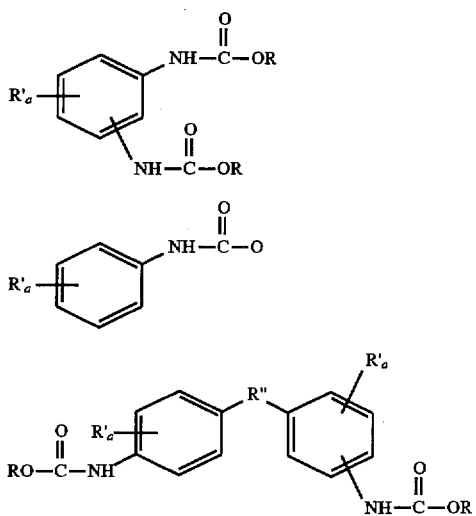

wherein R is a monovalent group; R' is alkyl, halo, alkoxy, and the like; R" is methylene, isopropylidene, ethylidene, or a covalent bond; and a is 0–4.

Preferred urea hardeners are those that are the reaction products of dimethylamine with mixtures of 80% 2,4-tolylene diisocyanate and 20% 2,6-tolylene diisocyanate, polymeric isocyanate, p-chlorophenylisocyanate, 3,4-dichlorophenylisocyanate or phenylisocyanate.

Accelerators may also be used and include imidazoles and substituted ureas. Examples include 2-ethyl-4-methylimidazol and p-chlorophenyl-1, 1-dimethyl urea.

The amount of the hardener employed is usually stoichiometric on the basis of one amine group per epoxy group in the resin. If the epoxide is a triepoxide and the hardener is a diamine, then the molar ratio of hardener to epoxide would typically be about 2.5/3 or 0.83. A typical formulation would have a weight ratio of epoxy resin to hardener of about 3/2 to about 4/1. Where any of the hardeners serve primarily as extenders of the epoxide resin, then the amount of the hardener in the typical case will be less than that generally employed for hardening the epoxide. Mixtures the above hardeners and with other hardeners are within the contemplation of this invention.

Other reactive resin systems include the various thermosetting or thermosettable resins include the bismaleimide (BMI), phenolic, polyester (especially the unsaturated polyester resins typically used in SMC production), PMR-15 polyimide and acetylene terminated resins are also suitable.

The urethane systems represent a typical non-engineering polymer for applications demanding less performance than, for example, the epoxy resin systems. They typically comprise the reaction of a polyisocyanate, a polyol, alone or with another active hydrogen compound, typically in the presence of a catalyst, such as an amine catalyst. However, in the practice of this invention, the polyurethane is a mixture of a blocked polyisocyanate, such as the reaction product of a mono-ol or monohydroxy phenolic compound with a polyisocyanate that is an organic polyisocyanate. This includes an organic compounds that contain at least two isocyanato groups and include the hydrocarbon diisocyanates (e.g., the alkylene diisocyanates and the arylene diisocyanates), as well as known triisocyanates and polymethylene poly (phenylene isocyanates).

The blocked isocyanates are compounds of the formula:

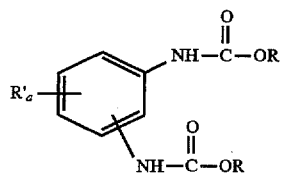

where R a monovalent organic group, R' is alkyl, alkoxy and the like, and a is 0–4.

Illustrative polyisocyanates for use in making the blocked isocyanates are: 2,4'-diisocyanatotoluene, 2,6-diisocyanatotoluene, methylene bis(4-cyclohexyl isocyanate), 1,2-diisocyanatoethane, 1,3-diisocyanatopropane, 1,2-diisocyanatopropane, 1,4-diisocyanatobutane, 1,5-diisocyauatopentane, 1,6-diisocyanatohexane, bis(3-isocyanatopropyl)ether, bis(3-isocyanatopropyl) sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethypentane, 1,9-diisocyanatononane, 1,10-disocyanatopropyl)ether of 1,4-butylene glycol, 1,11-diisocyanatoundecane, 1,12-diisocyanatododecane, bis (isocyanatohexyl) sulfide, 1,4-diisocyanatobenzene, 2,4-diisocyanatotolylene, 2,6-diisocyanatotolylene, 1,3-diisocyanato-o-xylene, 1,3-dilsocyanato-m-xylene, 1,3- diisocyanato-p-xylene, 2,4-diisocyanato-1-chlorobenzene, 2,4-diisocyanato-1-nitrobenzene, 2,5-diisocyanato-1-nitrobenzene, 4,4-diphenylmethylene diisocyanate, 3,3-diphenyl-methylene diisocyanate, polymethylene poly (phenyleneisocyanates), isophorone diisocyanate, and mixtures thereof.

The preferred polyisocyanates are mixture of 80% 2,4-tolylene diisocyanate and 20% 2,6-tolylene diisocyanate and polymeric isocyanate. The blocked isocyanates comprise any oft he above polyisocyanates reacted with a monofunctional hydroxy containing compound. The resultant blocked polyisocyanate is unreactive towards hydroxyl compounds at room temperature but, at elevated temperatures, will function as an isocyanate to crosslink the hydroxyl compounds to form the thermoset resin. For example, an adduct of tolylene diisocyanate and trimethylolpropane is first prepared in solution, followed by the addition of phenol to block the remaining isocyanate groups. Illustrative of such a blocked polyisocyanate is a phenol blocked toluene diisocyanate in cellosolve acetate sold by Mobay Chemical Co., as Mondur S. Such blocked isocyanates, when mixed with the polyols, provide a thermosetting polyurethane matrix resin that can form a tacky thin in situ-expandable film that is storable and curable on demand, in accordance with the invention.

The polyols used in forming the polyurethane may be an organic diol, triol, tetraol, pentaol, and the like. illustrative are the following compounds: ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,3-propanediol, and the like; or formed from by the alkoxylation of a starter polyol, such as the class of polyols characterized; or formed from reaction of the above diols, triols, etc., with caprolactone. The resulting ester polyols ("Tone's") are widely used in reactions with isocyanate. Desirable alkoxylated polyols are alkylene oxide adducts of a hydroxylated alcohols of the formula:

$$A(OH)_{>1}$$

and preferably a "starter" diol, triol, tetraol and higher hydroxylated alcohols, of the formula:

$$A(OH)_{\geq 2-6}$$

wherein A is a polyvalent organic moiety, the free valence of which is 2–6 or greater, or an average value equal thereto, as the case may be.

Illustrative of suitable compounds embraced by the "starter" $A(OH)_{\geq 2-6}$ alcohol are the following: ethylene glycol, diethylene glycol, 1,2-propylene glycol, polyethylene glycol, polypropylene glycol, glycerine, pentaerythritol, sorbitol, diether of sorbitol, mannitol, diether of mannitol, arabitol, diether or arabitol, sucrose, mixtures thereof, and the like.

The starter $A(OH) \geq 2-6$ is first reacted with 1,2-alkylene oxide in an amount and under conditions sufficient to convert its hydroxyl groups to hydroxyalkyl groups. The amount of 1,2-alkylene oxide reacted is sufficient to achieve the ultimate molecular weight of the alkoxylated polyol adduct. The molecular weight of the alkoxylated polyol adduct should be relatively high, preferably above about 4000 (number average) and, more preferably, above about 5000. The minimum molecular weight of the alkoxylated polyol adduct may be about 2000. The preferred 1,2-alkylene oxides are lower 1,2-alkylene oxides, such as ethylene oxide, 1,2-propylene oxide, 1,2-butylene and the like. The resulting polyol may be hydroxyethyl capped by reaction with 1,2-ethylene oxide to provide assurance of primary hydroxyl content in the polyol especially if the alkoxylated polyol adduct is subsequently coupled, not polymerized, with an organic polyisocyanate. Such alkoxylation reactions, with consequent adduct formation, is well known in the art. Adduct reactions may be base or acid catalyzed, with base catalyzation preferred.

The organic polyol may be a polyester polyol, such as a polyester of a dicarboxylic acid, acid halide or anhydride and a polyol, such as those characterized above. In this case, it is desirable to allow the polymer to be hydroxyl terminated, and conventional procedures in the art are useful for this purpose. A polyol is also employed to produce the polyester. Such polyols include ethylene glycol, diethylene glycol, propylene glycol, dipropylene glycol, butylene glycols, neopentyl glycol, glycerol and 1,1,1-trimethylolpropane.

Polyester resins usable as the thermosetting matrix resin, are typically reaction products of a dicarboxylic acid, add halide or anhydride, with a polyhydric alcohol. The dicarboxylic acids or Anhydrides that are employed to produce the polyester, either singly or in combination, include those that contain olefinic unsaturation, preferably wherein the olefinic unsaturation is alpha, beta- to at least one of the carboxylic acid groups, saturated aliphatic, heteroaliphatic and aromatic polycarboxylic acids, and the like. Such acids include maleic acid or anhydride, fumaric acid, methyl maleic acid, and itaconic acid (maleic acid or anhydride and fumaric acid are the most widely used commercially), saturated and/or aromatic dicarboxylic acids or anhydrides such as phthalic acid or anhydride, terephthalic acid, hexahydrophthalic acid or anhydride, adipic acid, isophthalic acid, and "dimer" acid (i.e., dimerized fatty acids). They may be cured by providing a polymerization initiator and low viscosity crosslinking monomers in the formulation. Where the resin is a unsaturated polyester or vinyl ester, it is preferred that the monomers contain ethylenic unsaturation such that the monomer is copolymerizable with the polyester and terminally unsaturated vinyl ester resins. Useful monomers include monostyrene, alkyl acrylates and methacrylates such as $C_{1-12}$ alkyl acrylates and methacrylates, substituted styrenes such as alpha-methyl styrene, alpha-chlorostyrene, 4-methylstyrene, and the like, divinylbenzene, acrylonitrile, methacrylonitrile, and the like. Styrene is the preferred monomer in commercial practice today, although others can be used. Suitable polymerization initiators include t-butyl hydroperoxide, t-butyl perbenzoate, benzoyl peroxide, cumene hydroperoxide, methyl ethyl ketone peroxide, and others known to the art. The polymerization initiator is employed in a catalytically effective amount, such as from about 0.3 to about 2 to 3 weight percent, based on the weight of polyester and the crosslinking monomer.

When desired, a thickening agent can also be employed in the polyester thermosetting compositions. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of the polyester resin and crosslinking monomer.

Particularly desirable materials for rendering the thermosetting resin non-pourable are thixotropic agents and/or elastomer-type polymers that provide discrete elastomer phases (second phases) in the thermosetting resin matrix. Certain of these material may reduce, to some finite degree, the crosslinking density of the thermoset resin (C-stage). Many of these materials introduce very favorable properties to the resulting thermoset resin. For example, a particularly desirable material for this purpose, is an elastomeric polymer containing soft and hard segments, the hard segments acing like or forming on processing, crosslinking of the elastomeric type. Some of these elastomeric types contain functional end groups which allow it to couple with complementary functional monomers or polymers to form the desired elastomer in situ of the thermosetting resin and render it non-pourable and tacky, while toughening the cured resin. As a class, these elastomeric polymers act or are crosslinked yet are thermoprocessable, which when discretely provided in the matrix resin renders the resin non-pourable and tacky, and also toughens it.

One class of suitable elastomer-type thermosplastic ABS (acrylonitrile-1,4-butadiene-styrene) block copolymers that are typically used as modifiers of other resin systems. They are characterized as having a wide range of properties though the preferred systems of the invention utilize copolymers that are high rubber types that, when compared to other copolymers of this type, have a relatively low tensile strength, low tensile modulus, higher impact resistance, low hardness and heat deflection temperature.

Another elastomer that is found desirable are the carboxyl and amine terminated liquid butadiene acrylonitrile copolymers. Such copolymers may contain pendant carboxyl groups in the interior of the polymer structure through the inclusion of methacrylic or acrylic acid in the polymerization or through the hydrolysis of some of the pendant nitrile units. Such polymers react with the epoxy resin and as a result, the epoxy fores the hard segment generating the elastomer properties.

Another class of block thermoplastic elastomers are Kraton®, available from Shell Chemical Company. These thermoplastic rubber polymers possess usable thermoplastic properties. They can be softened and they flow under heat and pressure. They then recover their structures on cooling. The chemical make-up are of three discrete blocks of the linear or A-B-A type. They are available as styrene-butadiene-styrene (S-B-S) block copolymers, styrene-isoprene-styrene (S-B-S) block copolymers and styrene-ethylene/butylene-styrene (S-EB-S) block copolymers. They are characterized by styrene polymer endblocks and an elastomeric midblock. After processing, the polystyrene endblocks physically crosslink locking the rubber network in place. This physical crosslinking is reversible on heating.

Another series of the Kraton® thermoplastic rubbers are the diblock polymers in which one block is a hard thermoplastic and the other is a saturated soft elastomer. Illustrative of this series is Kraton® G 1701, a diblock polymer of a hard polystyrene block and a saturated, soft poly(ethylene-propylene) block.

Other rubbers or elastomers include: (a) homopolymers or copolymers of conjugated dienes having a weight average molecular weight of 30,000 to 400,000 or higher as described in U.S. Pat. No. 4,020,036, in which the conjugated dienes contain from 4–11 carbon atoms per molecule such as 1,3-butadiene, isoprene, and the like; (b) epihalohydrin homopolymers, a copolymer of two or more epihalohydrin monomer, or a copolymer of an epihalohydrin monomer(s) with an oxide monomer(s) having a number average molecular weight (Mn) which varies from about 800 to about 50,000, as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer make-up of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene/norbornadiene, as described in U.S. Pat. No. 4,161,471; (e) conjugated diene butyl elastomers, such as copolymers consisting of from 85 to 99.5% by weight of a $C_4$–$C_5$ isolefin combined with 15 to 0.5% by weight of a conjugated multiolefin having 4 to 14 carbon atoms, copolymers of isobutylene and isoprene where a major portion of the isoprene units combined therein have conjugated diene unsaturation, as described in U.S. Pat. No. 4,160,759.

Specific illustrations of suitable elastomeric polymers are the following:

1. Hycar™ CTBN liquid reactive rubbers, carboxyl terminated butadieneacrylonitrile copolymers sold by B. F. Goodrich.
2. Hycar™ CTBNX, similar to CTBN except that they contain internal pendant carboxyl groups, also supplied by B. F. Goodrich.
3. Hycar™ ATBN, amine terminated butadiene-acrylonitrile copolymers sold by B. F. Goodrich.
4. K 1102-28:72 styrene:butadiene linear SBS polymer, available from Shell Chemical Company as Kraton® 1102.
5. KDX 1118-30:70 styrene:butadiene copolymer containing 20% SBS tri-block and 80% SB diblock, available from Shell Chemical Company as Kraton® DX 1118.
6. KG 1657-14:86 styrene:ethylene-butylene:styrene copolymer available from Shell Chemical Company as Kraton® G1657.
7. S 840 A-Stereospecific 43:57 styrene-butadiene SB rubber available from Firestone Synthetic Rubber & Latex Company as Stereon® 840A.
8. SBR 1006-random 23.5:76.5 styrene:butadiene SB block copolymer rubber available from Goodrich Chemical Company as Ameripol® 1006.
9. SBR 1502-Random 23.5:77.5 styrene:butadiene rubber available from Hules Mexicanos, or from Goodrich Rubber Company as Ameripol™ 1502. Cycolac® Blendex modifier resins (e.g., 305, 310, 336 and 405)—ABS polymers sold by Borg-Warner Chemicals, Inc. Different varieties are available and their suitability depends on the properties sought.

Additional flow reductions are provided by thixotroping agents such as fumed silica. illustrative of thixotropic agents are high surface area fumed silicas and organosilyl blocked fumed silicas, and the like.

The microsphere and/or the epoxy formulation may contain silane coupling agents. Illustrative silane coupling agents are the epoxycyclohexylethyltrialkoxysilanes, the aminoalkyltrialkoxysilane, and the gamma-methacryloxypropyl trialkoxysilane, and the like.

We claim:

1. A syntactic foam comprising a uniformly thin sheet with a thickness of about 0.007 to about 0.125 inch that does not vary in thickness by more than about ±5%, which sheet is a composite filled with hollow microspheres in a polymer matrix resin where the resin encapsulates the microspheres and the filled composite at weight equilibrium has less than 15% of the available internal volume of the microspheres occupied by liquid water whereby the composite possesses enhanced moisture resistance.

2. The syntactic foam of claim 1 wherein the microspheres are made of glass.

3. The syntactic foam of claim 1 wherein the polymer matrix resin is an epoxy resin.

4. The syntactic foam of claim 3 wherein the epoxy resin is an adhesive.

5. The syntactic foam of claim 1 wherein the amount of liquid water is determined by the LMA test.

6. An article of manufacture comprising a multi-layer composite in which one of the layers contains the syntactic foam of claim 1.

7. The article of manufacture of claim 6 wherein the matrix resin is an epoxy resin.

8. The article of manufacture of claim 6 wherein the microspheres are made of glass.

9. The article of manufacture of claim 6 wherein one of the layers is a prepreg.

* * * * *